United States Patent [19]

Katayose

[11] Patent Number: 5,408,643
[45] Date of Patent: Apr. 18, 1995

[54] WATCHDOG TIMER WITH A NON-MASKED INTERRUPT MASKED ONLY WHEN A WATCHDOG TIMER HAS BEEN CLEARED

[75] Inventor: Tsuyoshi Katayose, Tokyo, Japan

[73] Assignee: NEC Corporation, Tokyo, Japan

[21] Appl. No.: 830,421

[22] Filed: Feb. 3, 1992

[30] Foreign Application Priority Data

Feb. 1, 1991 [JP] Japan .................. 3-011827

[51] Int. Cl.⁶ ............................................ G06F 11/00
[52] U.S. Cl. ................................ 395/575; 371/16.3; 371/621
[58] Field of Search ............................ 371/62, 16.3, 12; 395/575

[56] References Cited

U.S. PATENT DOCUMENTS

| 4,726,024 | 2/1988 | Guziak et al. | 371/16.3 |
| 4,796,211 | 1/1989 | Yokouchi et al. | 371/62 |
| 4,809,280 | 2/1989 | Shonaka | 371/62 |
| 4,956,842 | 9/1990 | Said | 371/62 |

FOREIGN PATENT DOCUMENTS

| 0008349 | 1/1983 | Japan | 371/12 |
| 0029239 | 2/1986 | Japan | 371/12 |
| 0055601 | 3/1988 | Japan | 371/16.3 |

OTHER PUBLICATIONS

IBM Technical Disclosure Bulletin vol. 30, No. 11, Apr. 1988.
EDN Magazine vol. 25, No. 19, pp. 113-115, 117, 118 "Software-Based Refresh Scheme Saves Hardware'-'—Duane Graden.

Primary Examiner—Robert W. Beausoliel, Jr.
Assistant Examiner—Ly V. Hua
Attorney, Agent, or Firm—Whitham, Curtis, Whitham & McGinn

[57] ABSTRACT

A microcomputer comprises a central processing unit, a watchdog timer generating a watchdog timer processing request when an overflow occurs in the watchdog timer, and an interrupt controller processing as a non-maskable interrupt the watchdog timer processing request generated by the watch timer. The central processing unit generates a preset signal to the watchdog timer at a beginning of execution of another interrupt processing by the central processing unit, so as to preset the watchdog timer. The interrupt controller responds to the preset signal for cancelling the watchdog timer processing request generated by the watchdog timer in a period of time of retaining the watchdog timer processing request by the interrupt controller.

3 Claims, 3 Drawing Sheets

WATCHDOG TIMER WITH A NON-MASKED INTERRUPT MASKED ONLY WHEN A WATCHDOG TIMER HAS BEEN CLEARED

BACKGROUND OF THE INVENTION

1. Field of the Invention

The present invention generally relates to a microcomputer, and more specifically to a microcomputer having a central processing unit, and a watchdog timer generating a non-maskable interrupt in response to an overflow of the timer.

2. Description of the Prior Art

Conventionally, many microcomputers include a central processing unit (CPU), an interrupt controller (INTC), and peripheral circuits such as an analog-to-digital (A/D) converter and a serial transfer circuit, all of which are manufactured in a single semiconductor chip. Also, many microcomputers include a watchdog timer (WDT) which generates a non-maskable interrupt in response to an overflow of the timer in order to improve the reliability of the microcomputer system.

When a watchdog timer is used, a program for clearing (or presetting) a counter of the watchdog timer within a predetermined time period is executed, so that if the program executed without trouble, no overflow of the watchdog timer is generated. For example, at a time of program runaway, if the counter of the watchdog timer is not preset because of occurrence of an anomaly even after the predetermined time period has elapsed, an overflow occurs in the watchdog timer. This overflow is detected as a non-maskable interrupt, and a notice of a system abnormality is transmitted to an external device and program operation is branched to a previously programmed routine, such as a reset routine for performing processing for the anomaly occurrence.

As mentioned above, the WDT (watchdog timer) interrupt cannot be masked by an external interrupt (EI) flag or the like, in contrast to ordinary maskable interrupts. Therefore, when another interrupt processing routine is under execution, if the WDT interrupt occurs, the operation is branched to the WDT interrupt processing routine. Accordingly, when it is necessary to prepare a program which is generated and processed asynchronously from an execution condition of an internal program, similarly to an interrupt processing routine for processing an interrupt request from an external device, there is a possibility that the counter of the watchdog timer cannot be preset within the predetermined time period. Therefore, in order to preventing the WDT interrupt from occurring because the situation is misunderstood as being a system abnormality, the WDT preset instruction is executed at a beginning of the interrupt processing routine.

Also in the case that it is desired to complete an interrupt processing routine in the shortest time, as in an application system for detecting from an external interrupt (EI) that the supply of an electric power to the system is stopped, and executing a saving of control data and change of port outputs, the WDT preset instruction is executed at a beginning of the interrupt processing routine in order to avoid wasted time due to the occurrence of the WDT interrupt.

In order to make it possible to execute the WDT preset instruction at a beginning of the interrupt processing routine, the CPU does not receive an interrupt request from the interrupt controller just after the operation is branched to the interrupt processing routine. As a result, an instruction at a heading address of the interrupt processing routine is executed without exception. On the other hand, the interrupt controller performs receipt of interrupt processing requests and a priority level control, and notifies the CPU of the occurrence of interrupt request. When a plurality of interrupt processing requests are in conflict, this interrupt controller is configured to process the first request, in order of occurrence, and to retain later occurring request(s). Therefore, when an external interrupt (EI) request occurs and is transferred from the interrupt controller to the CPU, if the WDT interrupt processing request occurs in a period in which the CPU is executing the branch processing going to the external terminal interrupt processing routine, the CPU first branches to the external terminal interrupt processing routine so as to execute the heading instruction thereof, and thereafter, branches to the WDT interrupt processing routine.

Although the watchdog timer presetting is executed at the beginning of the interrupt processing routine, if the overflow occurs in the watchdog timer, there is the possibility that during the execution of the external terminal interrupt processing, the operation is branched to the WDT interrupt processing routine by the WDT interrupt processing request. In the conventional microcomputer, when the WDT interrupt and another interrupt are in conflict, even if the WDT presetting instruction is executed at a beginning of the first branched interrupt processing routine, the overflow occurs in the watchdog timer, and the operation is branched to the WDT interrupt processing routine by the WDT interrupt processing request. Therefore, in the case in which it is desired to complete an interrupt processing routine in a short time, as in an application system for detecting from an external interrupt (EI) that the supply of an electric power to the system is stopped and executing a saving of control data and change of port outputs, when the WDT interrupt processing routine performs the branch to the reset routine, the processing for the electric power-off is not executed.

On the other hand, in the case that the WDT interrupt processing routine does not perform the branch to the reset routine and the operation is returned to the first branched interrupt processing routine after the WDT interrupt processing has been completed, since it is necessary to design the system by previously calculating the processing time of the WDT interrupt as wasted time, an additional circuit for maintaining the electric power supply to the microcomputer during a predetermined period of time after the power-off of the main electric power supply to the application system is required to have a larger electric power supply capacity. This solution adds expense to the system.

SUMMARY OF THE INVENTION

It is therefore an object of the present invention to provide a microcomputer with a watchdog timer which has overcome the above mentioned defect of the conventional one.

Another object of the present invention is to provide a microcomputer having a watchdog timer and which does not branch to the WDT interrupt processing routine when the WDT interrupt request occurs in the course of execution of a first or previously branched interrupt processing routine.

The above and other objects of the present invention are achieved in accordance with the present invention by a microcomputer comprising a central processing unit, a watchdog timer generating a processing request when an overflow occurs in the watchdog timer, an interrupt control circuit processing as a non-maskable interrupt the processing request generated by the watchdog timer, means for outputting a preset signal to the watchdog timer in response to execution of an instruction of the central processing unit, so as to preset the watchdog timer, and means responding to the preset signal for canceling the processing request generated by the watchdog timer during a period of time of retaining the processing request by the interrupt control circuit.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
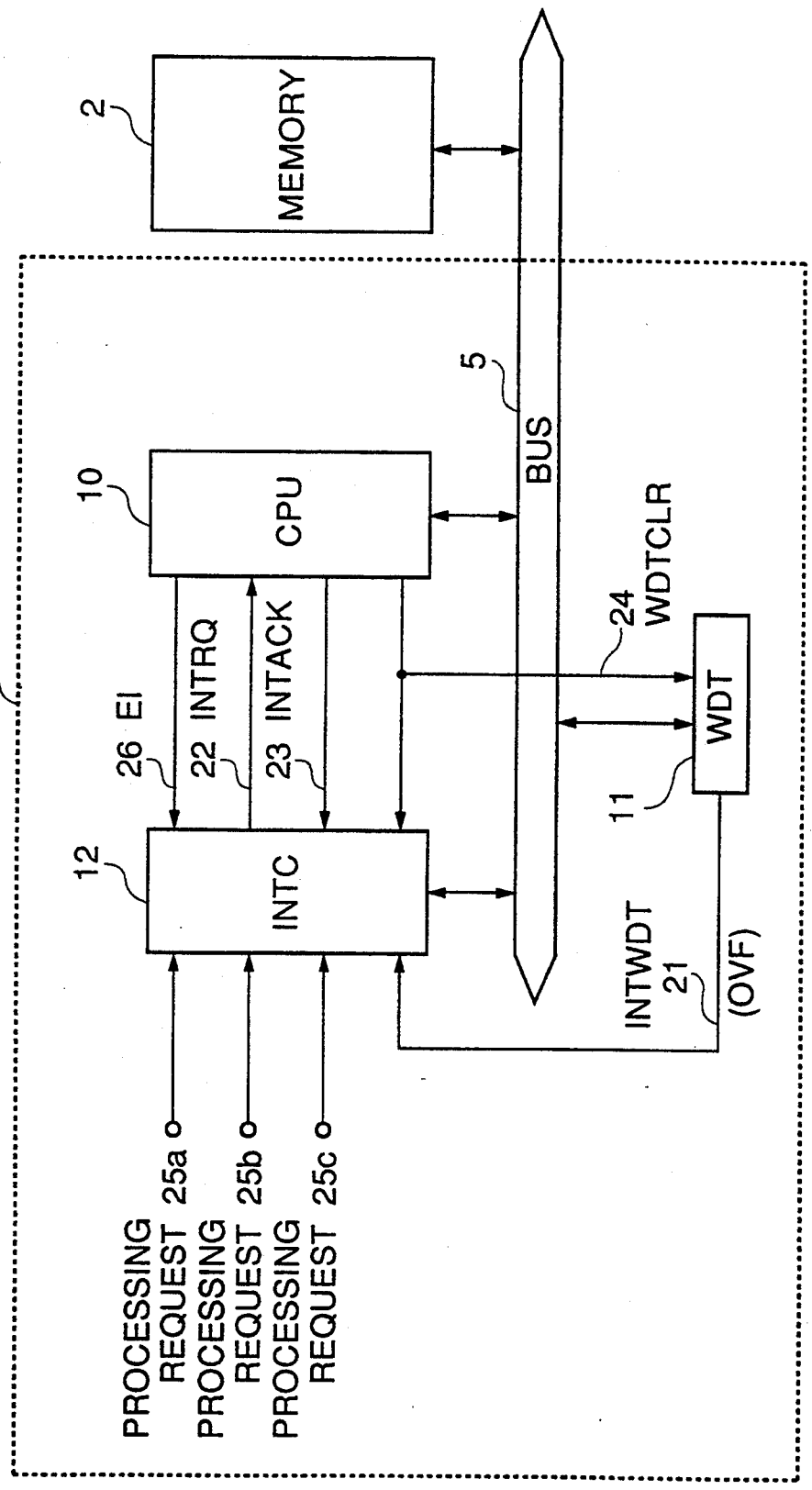
FIG. 1 is a block diagram of an essential part of one embodiment of the microcomputer in accordance with the present invention.

Referring now to the drawings, and more particularly to FIG. 1, there is shown a block diagram of an essential part of one embodiment of the microcomputer in accordance with the present invention. The microcomputer 1 is configured so that when a CPU 10 (central processing unit) executes a WDT (watchdog timer) preset instruction, an interrupt controller (INTC) 12 automatically cancels a WDT interrupt which has not yet been received by the CPU or is retained by the CPU. More particularly, the microcomputer 1 is coupled through a bus 5 to a memory unit 2. The microcomputer 1 includes therein a CPU 10, a watchdog timer 11 and an interrupt controller 12, which are coupled through the bus 5 for a mutual transfer of data between the CPU 10, the watchdog timer 11 and the interrupt controller 12.

The CPU 10 includes therein a program counter, a program status word, an arithmetic and logic unit, an instruction decoder, various control registers, maskable interrupt disable/enable flags, etc., which are not shown in the drawing for simplification of the drawings since these elements are well known to persons skilled in the art. The CPU 10 performs various internal operation controls of the microcomputer 1 including control of execution of instructions including a preset instruction used only for the watchdog timer 11 and an interrupt processing control.

The memory unit 2 includes a program memory and a data memory (both of which are not shown) for storing various types of dam. The watchdog timer 11 is configured to start its count operation when the CPU 10 executes a WDT preset instruction after a resetting of the system and generates a WDTCLR (watchdog timer clear) signal 24. Thereafter, each time the WDT preset instruction is executed, the watchdog timer is preset. Here, the counting operation of the watchdog timer cannot be stopped by a method other than the inputting of a system reset. If an overflow occurs in the watchdog timer before the WDT preset instruction is executed, the watchdog timer 11 generates a WDT interrupt processing request INTWDT 21, which is input to the interrupt controller 12.

The interrupt controller 12 receives a maskable external interrupt signal EI 26, and performs the receipt control and the priority level control of the processing request INTWDT 21 and other occurring interrupt requests, on the basis of the received maskable external interrupt signal EI 26 and contents of internal control registers provided in the interrupt controller. As a result, when a condition for receiving the interrupt is satisfied, the interrupt controller 12 outputs an interrupt request signal INTREQ 22 to the CPU 10.

If the CPU 10 receives the interrupt request signal INTREQ 22, the CPU stops programmed processing being executed, and executes the interrupt processing. In order to be capable of restarting the stopped programmed processing, the CPU 10 saves information of the program counter and the program status word to a stack area of the memory unit 2. In addition, the CPU 10 generates an interrupt acknowledge signal INTACK 23 to the interrupt controller 12, and receives through the bus 5 from the interrupt controller 12, vector information for the interrupt request having the highest priority level among the presently occurring interrupt requests. On the basis of the received vector information, the CPU 10 branches to a heading or beginning address of an interrupt processing routine previously set in the memory unit 2. Thereafter, the branched interrupt processing routine is executed.

When the branched interrupt processing routine is completed, a return instruction IRET is executed, so that the program stopped because of the interrupt processing is restarted. For this purpose, the information of the program counter and the program status word saved in the stack area of the memory unit 2 is returned or restored. On the other hand, when the WDT preset instruction is executed by the CPU 10, the WDTCLR signal 24 is supplied to not only the watchdog timer but also the interrupt controller 12, and in response to the WDTCLR signal 24, the interrupt controller 12 cancels the WDT interrupt request internally held in the interrupt controller 12. With this arrangement, after the WDT preset instruction is executed, the operation will be never branched to the WDT interrupt routine until a next overflow occurs in the watchdog timer 11.

Figure 2:
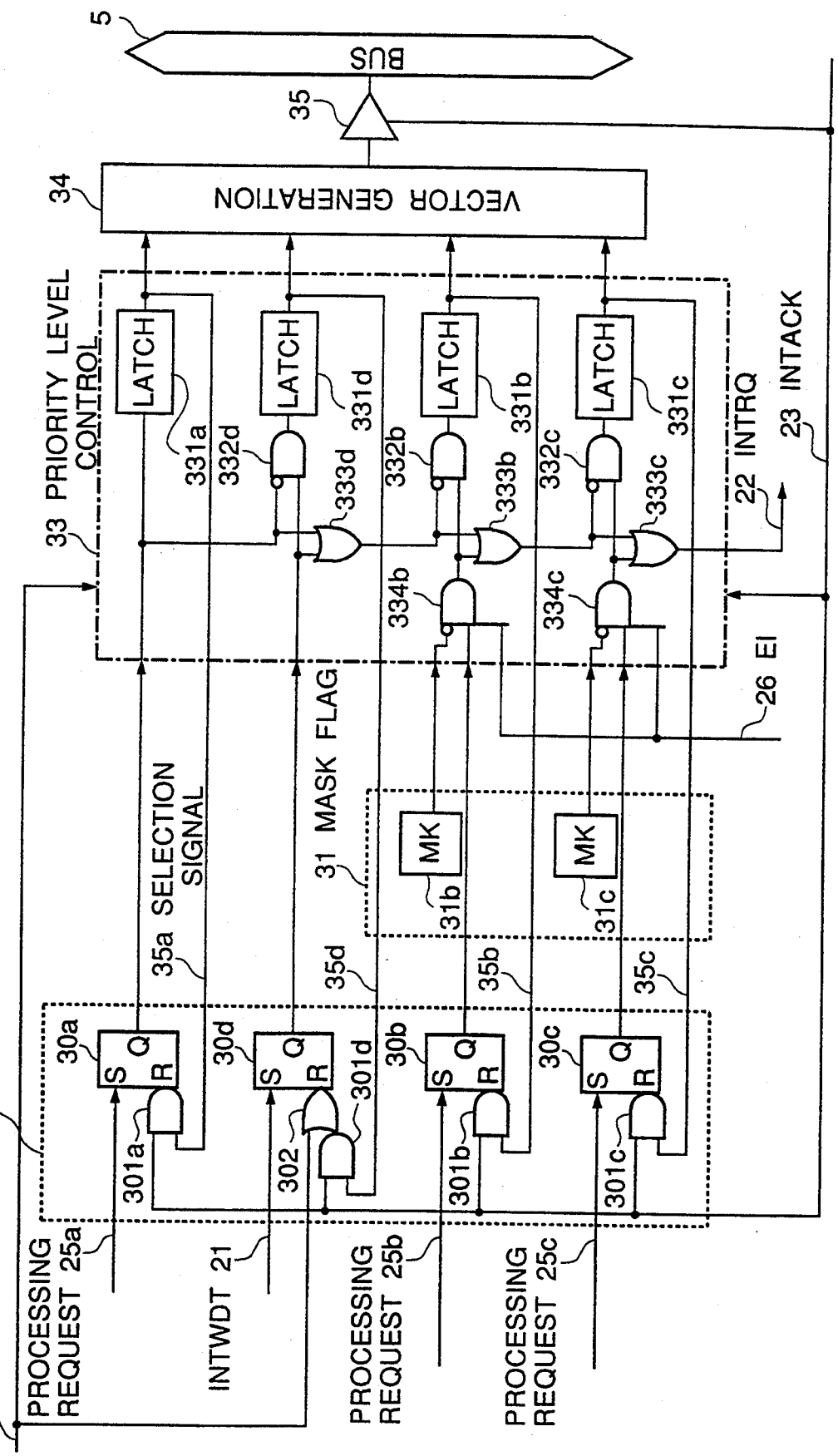
FIG. 2 is a logic circuit diagram of an essential part of the interrupt controller incorporated in the microcomputer shown in FIG. 1.

Now, an internal operation of the interrupt controller 12 will be described with reference to the logic circuit diagram of FIG. 2 illustrating the internal structure of the interrupt controller 12. For simplification of explanation, assume that the interrupt processing requests controlled by the interrupt controller 12 are four, namely three ordinary interrupt processing requests 25a, 25b and 25c, and the WDT interrupt processing request INTWDT 21.

The interrupt controller 12 includes four interrupt request flags 30a, 30b, 30c and 30d for individually storing a non-maskable interrupt processing request 25a, the WDT interrupt processing request INTWDT 21, and maskable interrupt processing requests 25b and 25c, respectively, and a mask flags 31b and 31c for individually disabling and enabling the maskable interrupt processing requests 25b and 25c, respectively. Furthermore, the interrupt controller 12 includes a priority level control unit 33 for performing a priority level control between the interrupt processing requests 25a, 25b and 25c and the WDT interrupt processing request INTWDT 21, so as to select an interrupt processing request having the highest priority level, and a vector generation unit 34 for generating a vector information corresponding to a selected one of the interrupt processing requests 25a, 25b and 25c and the WDT interrupt processing request INTWDT 21. The generated vector information is outputted to the bus 5 through a controlled buffer 35 which is activated when the interrupt request acknowledge signal 23 is active.

Specifically, the interrupt request flag 30a has a set input S connected to receive the interrupt processing request 25a, and a Q output connected to an input of a latch 331a of the priority level control unit 33. A selection signal 35a outputted from the latch 331a is connected to the vector generation unit 34 and one input of an AND gate 301a having an output connected to a reset input R of the flag 30a.

The interrupt request flag 30d has a set input S connected to receive the interrupt processing request INTWDT 21, and a Q output connected to an input of a non-inverting input of an AND gate 332d of the priority level control unit 33. The AND gate 332d has an inverting input connected to the Q output of the flag 30a, and an output of the AND gate 332d is connected to an input of a latch 331d of the priority level control unit 33. A selection signal 35d outputted from the latch 331d is connected to the vector generation unit 34 and one input of an AND gate 301d having an output connected through an OR gate 302 to a reset input R of the flag 30d. The OR gate 302 receives the WDTCLR signal 24 at its other input.

The interrupt request flag 30b has a set input S connected to receive the interrupt processing request 25b, and a Q output connected to an input of a non-inverting input of an AND gate 334b of the priority level control unit 33. The AND gate 334b has another non-inverting input connected to receive the external interrupt signal EI 26 and an inverting input connected to the mask flag 31b. An output of the AND gate 334b is connected to a non-inverting input of an AND gate 332b. The AND gate 332b has an inverting input connected to an output of an OR gate 333d having a pair of inputs connected to the Q output of the flags 30a and 30d, respectively. An output of the AND gate 332b is connected to an input of a latch 331b of the priority level control unit 33. A selection signal 35b outputted from the latch 331b is connected to the vector generation unit 34 and one input of an AND gate 301b having an output connected to a reset input R of the flag 30b.

The interrupt request flag 30c has a set input S connected to receive the interrupt processing request 25c, and a Q output connected to an input of a non-inverting input of an AND gate 334c of the priority level control unit 33. The AND gate 334c has another non-inverting input connected to receive the external interrupt signal EI 26 and an inverting input connected to the mask flag 31c. An output of the AND gate 334c is connected to a non-inverting input of an AND gate 332c. The AND gate 332c has an inverting input connected to an output of an OR gate 333b having a pair of inputs connected to the output of the AND gate 334b and the output of the OR gate 333d, respectively. An output of the AND gate 332c is connected to an input of a latch 331c of the priority level control unit 33. A selection signal 35c outputted from the latch 331c is connected to the vector generation unit 34 and one input of an AND gate 301c having an output connected to a reset input R of the flag 30b.

The output of the AND gate 334c and the output of the OR gate 333b are connected to a pair of inputs of an OR gate 333c, which in turn has an output generating the interrupt request signal INTRQ 22 to the CPU 10. The other input of each of the AND gates 301a, 301b, 301c and 301d is connected to receive the interrupt acknowledge signal INTACK 23. In addition, the internal latches 331a to 331d operate to latch their input not only when their input is activated to a logic "1", but also when the WDTCLR signal 24 is activated to a logic "1".

In this example, by action of the logic circuit structure composed of the AND gates 332d, 332b and 332c and the OR gates 333d and 333b, the priority levels of the interrupt processing requests 25a, 25b and 25c and the WDT interrupt processing request INTWDT 21 are fixed. Namely, the order of the priority levels is (the interrupt processing request 25a)>(the WDT interrupt processing request INTWDT 21)>(the interrupt processing request 25b)>(the interrupt processing request 25c). In addition, the maskable interrupt requests are in an acknowledge enable condition; that is, the external interrupt signal EI 26 is active and the mask flags 31b and 31c are not set.

Firstly, operation will be explained for the case in which a plurality of processing requests concurrently occur. When the interrupt processing request INTWDT 21 and the interrupt processing request 25b concurrently occur, the interrupt request flags 30d and 30b are set to logic "1", and this is communicated to the priority level control unit 33. As mentioned above, since (the WDT interrupt processing request INTWDT 21)>(the interrupt processing request 25b), the selection signal 35d is activated to logic "1", which is supplied to the vector generation unit 34 and also fed back to the interrupt request flag 30d. At the same time, the interrupt request signal INTRQ 22 is supplied to the CPU 10. At this time, all the other selection signals 35a, 35b and 35c are inactive, namely, logic "0".

If the interrupt request signal INTRQ 22 is acknowledged by the CPU 10, the interrupt acknowledge signal INTACK 23 is supplied to the interrupt controller 12. In response to this active interrupt acknowledge signal 23, the active selection signal 35d is passed through its associated AND gate 301d and applied to the reset input R of the interrupt request flag 30d, so as to reset the Q output of the interrupt request flag 30d to logic "0". On the other hand, the vector generation unit 34 outputs vector information corresponding to the interrupt request INTWDT 21, through the bus 5 to the CPU 10, since the control buffer 35 is put in an activated condition by the interrupt acknowledge signal 23.

Incidentally, the signal level of the selection signals 25a to 25d are ordinarily held in the internal latches 331a to 331d of the priority level control unit 33, after the interrupt request signal INTRQ 22 is generated until the interrupt acknowledge signal INTACK 24 is generated by the CPU 10. Therefore, the interrupt receiving processing for the interrupt processing request 25 is suspended or retained.

Next, operation will be described for the case in which a plurality of interrupt requests occur at timings different from each other. Assuming that the interrupt processing request 25c first occurs, the interrupt request flag 30c is set to logic "1", which is communicated to the priority level control unit 33. In the priority level control unit 33, the selection signal 35c is activated to logic "1" which is transferred to the vector generation unit 34 and fedback to the interrupt request flag 30c, and the interrupt request signal INTRQ 22 is outputted to the CPU 10. At this time, all the other selection signals 35a, 35b and 35d are inactive, namely, logic "0".

Thereafter, if the INTWDT signal 21 is generated, the interrupt request flag 30d is set logic "1", which is communicated to the priority order control unit 33. As mentioned above, the priority level relation is (the WDT interrupt processing request INTWDT 21)>(the interrupt processing request 25c), but since the interrupt request 22 has been communicated to the CPU 10, the selection signals 35a to 35d are maintained by the internal latches 331a to 331d until the interrupt acknowledge signal 23 is supplied to the interrupt controller 12 after the interrupt request 22 was acknowledged. As a result, the selection signals 35a to 35d remain unchanged. Accordingly, the interrupt acknowledge processing for the interrupt processing request signal INTWDT 21 is retained.

In both of the above mentioned cases, an operation of canceling the WDT interrupt when the WDT preset instruction is executed is as follows: When the WDT preset instruction is executed, the CPU 10 outputs the signal WDTCLR 24 to the interrupt controller 12, so that the interrupt request flag 35d is reset to logic "0".

Even during the hold period after the generation of the interrupt request signal INTRQ 22 until the receipt of the interrupt acknowledge signal INTACK 24, the internal latches 311a to 331d perform the latching operation again in response to the signal WDTCLR 24, so that the internal latches 311a to 311d are updated. As a result, the selection signal 35d is inactivated to logic "0", and therefore, the occurrence of the interrupt processing request signal INTWDT 21 is canceled. Accordingly, the WDT interrupt processing is never executed by the CPU 10, and the receipt control and the priority level control for the interrupt processing requests 25a to 25c other than the interrupt processing request INTWDT 21 are performed.

As mentioned above, this embodiment is configured such that when the CPU 10 executes the WDT preset instruction, the interrupt controller 12 automatically cancels the WDT interrupt request. Therefore, when the WDT interrupt request occurs concurrently with another interrupt request, if the WDT preset instruction is executed at a beginning of the previously branched interrupt processing routine, the operation is never branched to the WDT interrupt processing routine even if the overflow has already been generated and the interrupt processing request has been communicated to the interrupt controller 12.

Figure 3:
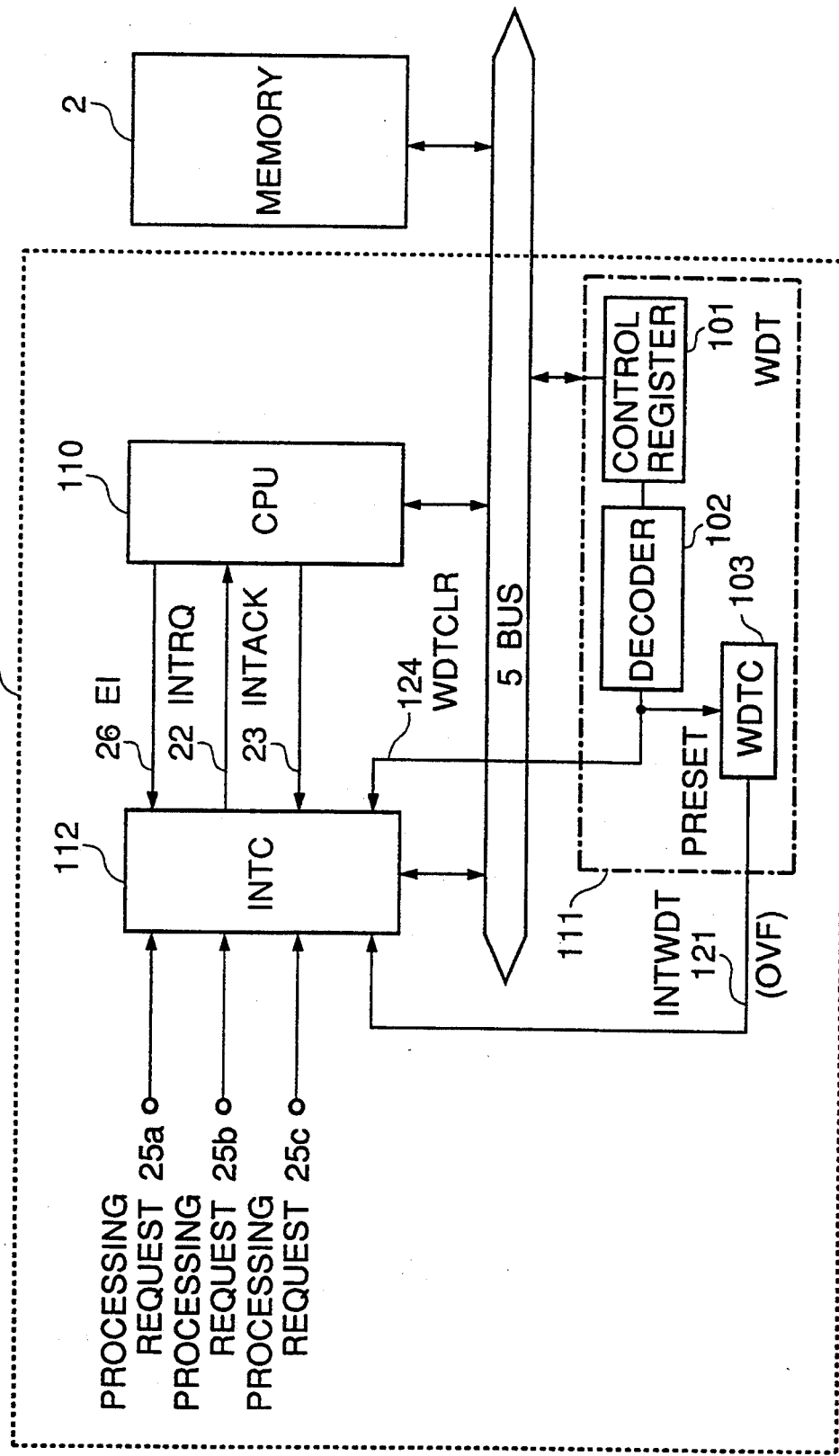
FIG. 3 is a block diagram of an essential part of another embodiment of the microcomputer in accordance with the present invention.

Referring to FIG. 3, there is shown a block diagram of an essential part of another embodiment of the microcomputer in accordance with the present invention. The second embodiment is different from the first embodiment only in the method in which the WDT preset instruction to be executed by the CPU and the WDTCLR signal are generated. Therefore, elements similar to those shown in FIG. I are given the same Reference Numerals and explanation thereof will be omitted.

This second embodiment differs from the first embodiment in which the WDT preset instruction is executed in the CPU 10 and the WDTCLR signal is generated by the CPU 10 in that the microcomputer 201 has a CPU 110 that writes predetermined data into an internal control register 101 of an watchdog timer 111 by using a general instruction, and a content of the internal control register 101 is decoded by an internal decoder 112, which presets a watchdog timer counter 103. The decoder 112 also generates a watchdog clear signal WDTCLR 124. The watchdog timer counter 103 generates the WDT interrupt processing request signal INTWDT 121 when an overflow occurs in the watchdog timer counter 103.

Thus, the CPU 110 is not required to have therein a circuit for executing an instruction for only the WDT preset instruction. Therefore, it is possible to control the watchdog timer 111 even by using the CPU of the microcomputer having an instruction set which does not include the instruction for only the WDT preset instruction. This is applicable to a custom large scale integrated (LSI) circuit microcomputer in which a CPU block is made in common and a peripheral circuit including the watchdog timer is customized. In the above mentioned embodiment, the WDT interrupt request flag is located in the interrupt controller. However, a similar effect can be expected even if modification is made to the effect that a flag for storing a processing request is internally provided in the watchdog timer and an interrupt request signal held in the flag internally provided in the watchdog timer is transferred to the interrupt controller. This is called a so called level interrupt control.

As seen form the above explanation, the microcomputer in accordance with the present invention is such that when the WDT interrupt request occurs in conflict with another interrupt request, if the WDT preset instruction is executed at a beginning of the previously branched interrupt processing routine, the operation is never branched to the WDT interrupt processing routine even if the overflow has already generated and the interrupt processing request has been communicated to the interrupt controller 12.

Therefore, in an application system for detecting from an external interrupt (EI) that the supply of an electric power to the system is stopped, and executing a saving of control data and change of port outputs, it is possible to avoid the inconvenience in which the processing for the electric power-off is not executed because the operation is branched to the reset routine when the WDT interrupt processing request occurs. Accordingly, an appropriate processing can be performed. In addition, in the case that when the WDT interrupt processing request occurs the operation is not branched to the reset routine, it is no longer necessary to design the system by previously calculating the processing time of the WDT interrupt as a waste time. Therefore, the interrupt processing routine of the external terminal interrupt can be completed in a short time.

The invention has thus been shown and described with reference to the specific embodiments. However, it should be noted that the present invention is in no way limited to the details of the illustrated structures but changes and modifications may be made within the scope of the appended claims.

I claim:

1. A microcomputer comprising:
   a bus;
   a central processing unit coupled to said bus;
   a watchdog timer coupled to said bus, and generating a watchdog timer processing request when an overflow occurs in said watchdog timer, said watchdog timer being cleared by a watchdog timer clear signal generated by said central processing unit;

an interrupt control circuit coupled to said bus, and receiving said watchdog timer processing request and at least one interrupt processing request, said interrupt control circuit including:

an interrupt request flag group having a first interrupt request flag set by said watchdog timer processing request and a second interrupt request flag set by said at least one interrupt processing request, a priority level control unit including first and second latches provided in correspondence to said first and second interrupt request flags, respectively, said priority level control unit being coupled directly to an output of said first interrupt request flag, for generating an active interrupt request signal to said central processing unit when the output of at least one of said first and second interrupt request flags is active, said priority level control unit operating to output an active signal to the latch corresponding to the processing request having the highest priority among the processing requests being generated, when the output of at least one of said first and second interrupt request flags is active, said active signal being latched into the corresponding latch in response to an interrupt acknowledge signal generated by said central processing unit after said central processing unit has received said active interrupt request signal, and a vector generation unit coupled to receive an output of each of said first and second latches, for outputting through said bus to said central processing unit, a vector information corresponding to the latch which has latched said active signal, said second interrupt request flag having a reset input connected to receive a logical product signal between said interrupt acknowledge signal and the output of said second latch, so that said second interrupt request flag is cleared when the interrupt processing request corresponding to said second interrupt request flag is acknowledged, said first interrupt request flag having a reset input connected to receive a logical sum signal between said watchdog timer clear signal and a logical product signal between said interrupt acknowledge signal and the output of said first latch, so that, said first interrupt request flag is cleared when said watchdog timer clear signal is generated or when said watchdog timer processing request is acknowledged, said first and second latches of said priority level control unit operating to latch their input in response to said interrupt acknowledge signal, whereby, when said watchdog timer clear signal is generated, said first interrupt request flag and said first latch are cleared, so that said watchdog timer processing request is canceled.

2. A microcomputer claimed in claim 1 wherein said watchdog timer includes a watchdog timer counter for generating said watchdog timer processing request when said watchdog timer counter overflows, an internal control register written with a predetermined data by said central processing unit, and an internal decoder for decoding a content of said internal control register so as to preset said watchdog timer counter when said internal decoder decodes said predetermined data.

3. A microcomputer comprising:

a bus (5);

a central processing unit (10) coupled to said bus, and receiving an interrupt request signal (INTRQ 22) and generating an interrupt acknowledge signal (INTACK 23) after said central processing unit has received said interrupt request signal;

a watchdog timer (11) coupled to said bus, and generating a watchdog timer interrupt processing request (INTWDT 21) when an overflow occurs in said watchdog timer, said watchdog timer being cleared by a watchdog timer clear signal (WDTCLR 24) generated by said central processing unit;

an interrupt control circuit (12) coupled to said bus, and receiving said watchdog timer interrupt processing request, a non-maskable interrupt processing request (25a), and a maskable interrupt processing request (25b), said interrupt control circuit including:

an interrupt request flag group having a first interrupt request flag (30a) set by said non-maskable interrupt processing request, a second interrupt request flag (30d) set by said watchdog timer interrupt processing request and a third interrupt request flag (30b) set by said maskable interrupt processing request, a priority level control unit (33) including a first latch (331a) having an input connected directly to an output of said first interrupt request flag (30a), a second latch (331d) having an input connected to an output of a first AND gate (332d) which has an inverted input connected to said output of said first interrupt request flag (30a) and a non-inverted input connected directly to an output of said second interrupt request flag (30d), a first OR gate (333d) having a pair of inputs connected to said outputs of said first and second interrupt request flags, a mask gate (344b) having a first input connected to an output of said third interrupt request flag (30b) and a second input connected to a mask flag signal (31b), a third latch (331b) having an input connected to an output of a second AND gate (232b) which has an inverted input connected to an output of said first OR gate and a non-inverted input connected to an output of said mask gate, and a second OR gate (333b) having a pair of inputs connected to said output of said first OR gate and said output of said mask gate, an output of said second OR gate generating the above mentioned interrupt request signal, each of said first, second and third latches operating to latch its input in response to said interrupt acknowledge signal and said watchdog timer clear signal, a vector generating unit coupled to an output of each of said first, second and third latches, for outputting through said bus to said central processing unit, a vector information corresponding to the latch latching an active signal, said first interrupt request flag having a reset input connected to an output of an AND gate (301a) which has a first input connected to the output of said first latch and a second input connected to receive said interrupt acknowledge signal, so that said first interrupt request flag is cleared when said non-maskable interrupt processing request is acknowledged, said third interrupt request flag having a reset input connected to an output of an AND gate (301b) which has a first input connected to the output of said third latch and a second input connected to receive said interrupt acknowledge signal, so that said third interrupt request flag is cleared when said maskable interrupt processing request is acknowledged, said second interrupt request flag having a reset input connected to an output of an OR gate (302) having a first input connected to receive said watchdog timer clear signal and a second input connected to an output of an AND gate (301d), which has a first input connected to the output of said second latch and a second input connected to receive said interrupt acknowledge signal, so that, when said watchdog timer interrupt processing request is acknowledged, said second interrupt request flag is cleared, and when said watchdog timer clear signal is generated, said second interrupt request flag and said second latch if set are cleared, so that said watchdog timer interrupt processing request is canceled before said watchdog timer interrupt processing request is actually executed.

* * * * *